July 4, 1933. W. W. WILHELM 1,917,174
CYLINDRICAL CAN BODY AND BLANK THEREFOR
Filed June 11, 1930
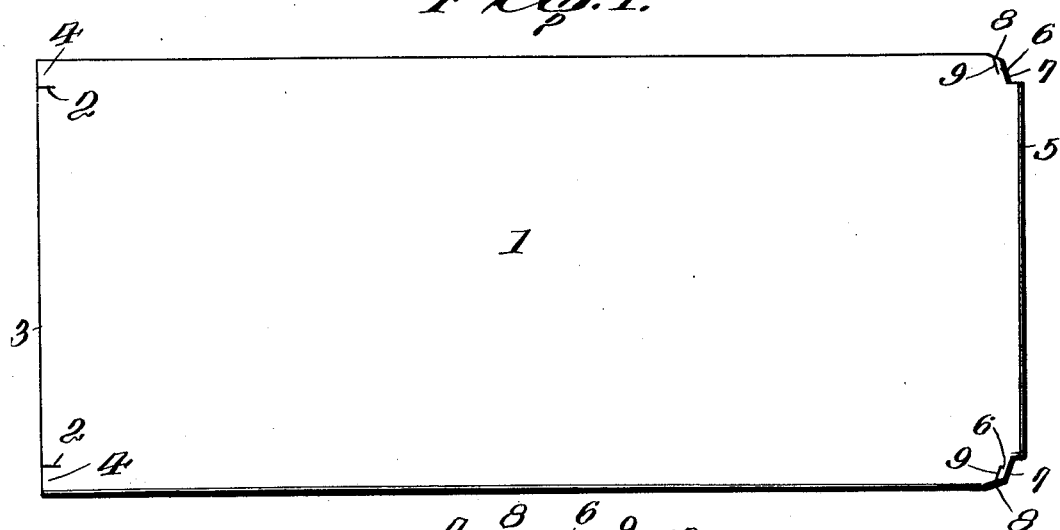
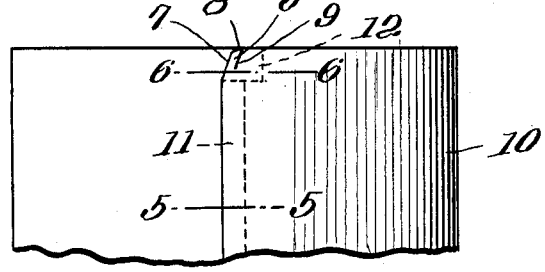
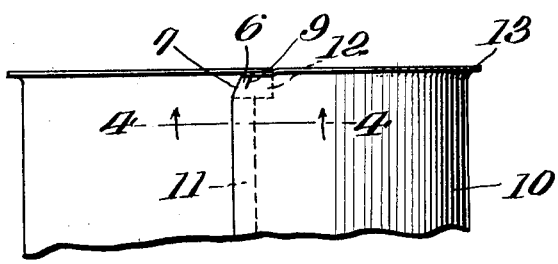
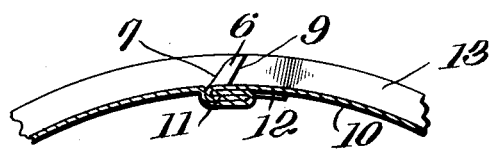
Inventor
W. W. WILHELM
By Sturtevant Mason & Porter
Attorneys Patented July 4, 1933

1,917,174

UNITED STATES PATENT OFFICE

WALTER W. WILHELM, OF CHICAGO, ILLINOIS, ASSIGNOR TO CONTINENTAL CAN COMPANY, INC., OF NEW YORK, N. Y., A CORPORATION OF NEW YORK

CYLINDRICAL CAN BODY AND BLANK THEREFOR

Application filed June 11, 1930. Serial No. 460,435.

The invention relates to new and useful improvements in a cylindrical can body and the body blank for forming the same.

It is customary to form a body blank and join the edges thereof in a side seam, thus producing a cylindrical can body. In order that the ends of the can may be joined to the body by double seaming the end portions of the side seam are merely lapped and secured by a solder bond. The can body must be flanged, and the flanging of the body necessarily expands the metal and it often occurs that this expanding of the metal in the region of the side seam through its shearing tension breaks the solder bond and may result in a leaky can.

An object of the present invention is to provide a construction of blank and side seam for the can body so as to prevent the shearing tension on the solder bond from rupturing the bond so as to produce a leak.

A further object of the invention is to provide a body blank with a slit or weakened portion at the end of the blank in the outer overlapping portion thereof, and extending in the general direction of the side seam for preventing the shearing strains on the lapped portion of the side seam incident to the flanging operation from rupturing the solder bond.

In the drawing which shows by way of illustration one embodiment of the invention:—

Figure 1 is a plan view of the blank embodying the improvements.

Figure 2 is a side view of the cylindrical body formed from the blank prior to the flanging operation.

Figure 3 is a similar view showing one end of the body as flanged.

Figure 4 is a sectional view on the line 4—4 of Fig. 3.

Figure 5 is a sectional view on the line 5—5 of Fig. 2.

Figure 6 is a sectional view on the line 6—6 of Fig. 2.

The invention is directed to a side seam for a cylindrical can body and the body blank for producing the can body. The can body is preferably of the lock and lap seam type. The side seam, therefore, throughout a greater portion of its length is inter-folded and interlocked as well as soldered. At the ends of the side seam the portions of the blank are merely overlapped and are joined solely by the solder bond. This is essential in order that the can body can be flanged for the double seaming of ends thereto. The body blank in the portion thereof, which is to form the outer lap, is provided with a slit or weakened portion which extends in the general direction of the length of the side seam. This slit or weakened portion is midway between the side limits of the solder bond joining the lapped portions of the blank. When the body wall is flanged the metal, of course, is caused to flow to produce the extended diameter necessary in the flange. Inasmuch as the one wall laps on to the other there is a difference in tension in these two lapped portions, incident to the flowing of the metal during the flanging operation. If this tension is too great on the solder bond the solder bond may be broken in that part of the lap between the slit and the outer edge of the lap, but the remainder of the solder bond will be undisturbed. This will be sufficient to produce the hermetic seal when the end is attached. Again this slit may open and the solder bond remain unbroken at both sides thereof.

Referring more in detail to the drawing the body blank is indicated at 1. Said blank is provided with slots 2 so as to provide a portion 3 which may be bent back to be interlocked with a bent portion at the other end of the blank. It is also provided with portions 4 which are overlapped at the ends of the side seams. The blank at the other end thereof is notched so as to provide a portion 5 which may be bent back and interlocked with the bent back portion 3. This forms the locked portion of the side seam. The portions 6, 6 of the blank are lapped on to the portions 4 in the forming of the cylindrical body. The solder is applied to the side seam which joins the interlocked portions and also the lapping portions 4 and 6. The edge 7 of the blank is slightly inclined and the blank at the end of this inclined edge is cut away as indicated at 8, so that when the flange is turned on the can body the outer lapping portion 6 will not project beyond the inner lapping portion 4.

The present invention is directed to the slitting or weakening of the blank as indicated at 9, 9 in the drawing. This slit as shown in parallel with the inclined edge 7 and is of a length slightly greater than the width of the flange to be formed on the can body. Instead of making this slit parallel with the edge 7 it may be parallel with the edge of the portion 5. It is essential that it shall extend in the general direction of the side seam so as to extend across the flange substantially in a direction at right angles to the edge of the flange. The blank 1 is shown as formed into a can body indicated at 10 in Figure 2. The interlocked portion of the side seam is indicated at 11 and the lapped portions at one end of the side seam is indicated at 12. The can body is provided with a flange 13 at each end thereof to which the end of the can is attached by a double seam. The slit 9 will extend all the way across the flange to the body wall of the can.

When the flange is turned on the can body by a flanging die or flanging roll the metal, as it is forced outwardly to form the flange, must necessarily flow or reshape itself in order to give the extended diameter that is present in the finished flange. This flowing or reshaping of the metal parts, particularly in the overlapped portions of the side seam, set up unequal stresses and strains which are likely to fracture the solder bond where there is no provision to reduce the strain on the solder bond. The slit in the outer overlapping portion of the side seam under this stress and strain, incident to flanging, may be open slightly thus releasing the strains on the solder bond so that the solder is not ruptured. Again the solder bond between the slit and the outer edge of the lapping portion may be ruptured, but the solder bond at the other side of the slit, which is of greater extent, will not be ruptured. This remaining solder bond is sufficient to produce a tight joint when the end is attached to the flange.

While the improvement has been described as applied to a lock and lap seam it may also be applied to a side seam which is lapped from one end to the other thereof. While it is preferred to cut the metal all the way through, it may be cut only part way through and weakened so as to reduce the tension and distribute the same, so that the solder bond will not be completely ruptured.

While I have referred to the main body as cylindrical, it will be understood, of course, that it may be oval or otherwise shaped. While I have also referred to solder as the bonding material used for producing the seal in the side seam, it will be understood that any suitable material may be used for bonding the metal parts together. While I have referred to the flange as being formed with a slit, it will be understood that a plurality of slits may be used instead of a single slit, and reference to a slit throughout the claims is intended to cover a single slit or one of a series.

Having thus described the invention, what is claimed as new and desired to be secured by Letters Patent is:—

1. A can body having a side seam wherein the ends are overlapped and joined by solder, the outer lapped portion of said body having a slit extending from the outer edge thereof in the general direction of the side seam, and located between the side limits of the overlapping portions whereby the strain on the solder bond between said lapping portions when the flange is turned on the can body will be distributed so as to avoid rupturing the solder bond joining said lapped portions.

2. A can body having a side seam provided with intermediate interlocked portions and overlapping end portions, said locking portions and lapping portions being joined by a solder bond, the outer lapped portion of the body at the ends of the side seam having a slit extending from the outer edge thereof in the general direction of the side seam and located between the side limits of the overlapping portions, whereby the strain on the solder bond between said lapping portions when the flange is turned on the can body will be distributed so as to avoid rupturing the solder bond joining the lapped portions.

3. A can body blank having portions adapted to be interlocked and portions adapted to be overlapped and soldered to form a side seam, said blank being provided with slits in the portion thereof forming the outer lap of the side seam, which slits extend from the edges of the blank in a direction substantially parallel with the side edges of the overlapping portions and to an extent substantially equal to the width of the flange to be formed from the blank in the can body.

In testimony whereof, I affix my signature.

WALTER W. WILHELM.